TEMPERATURE-CONTROLLED ENCLOSURE FOR ELECTRICAL COMPONENTS

Filed Nov. 16, 1953 3 Sheets-Sheet 1

INVENTOR.
RAMON FONT
BY Herman L. Gordon
ATTORNEY

TEMPERATURE-CONTROLLED ENCLOSURE FOR ELECTRICAL COMPONENTS

Filed Nov. 16, 1953 3 Sheets-Sheet 2

INVENTOR.
RAMON FONT
BY Herman L. Gordon
ATTORNEY

TEMPERATURE-CONTROLLED ENCLOSURE FOR ELECTRICAL COMPONENTS

Filed Nov. 16, 1953

INVENTOR.
RAMON FONT
BY Herman L. Gordon
ATTORNEY 2,844,742
Patented July 22, 1958

2,844,742

TEMPERATURE-CONTROLLED ENCLOSURE FOR ELECTRICAL COMPONENTS

Ramón Font, Richmond Hill, N. Y., assignor to Premier Research Laboratories, Inc., New York, N. Y., a corporation of New York

Application November 16, 1953, Serial No. 392,291

3 Claims. (Cl. 310—9)

This invention relates to enclosures for electrical components, and more particularly to temperature-controlled ovens for piezo-electric crystals and the like.

A main object of the invention is to provide a novel and improved temperature-controlled holder for an electrical component, such as a piezo-electric crystal, an inductance, a capacitor, a transistor, or a similar component which is to be maintained at a substantially constant temperature, the holder being simple in construction, being inexpensive to manufacture, and being stable in operation.

A further object of the invention is to provide an improved temperature-controlled holder for a crystal or other electrical component, which is compact in size, which is rugged in construction, and which is arranged to provide a stable internal temperature regardless of wide fluctuations in temperature outside the holder.

A still further object of the invention is to provide an improved temperature-controlled piezo-electric crystal assembly which involves relatively few parts, which is easy to assemble, which may be readily taken apart for adjustment without damage to any part thereof, and which provides accurate control of the temperature of its piezo-electric crystal element over a wide range of service conditions.

A still further object of the invention is to provide an improved temperature-controlled dual crystal assembly wherein means is provided for adjusting the frequency of the individual crystals, whereby a desired beat frequency difference can be obtained, achieving a frequency not obtainable by using a single crystal plate, said beat frequency difference being maintained constant by controlling the temperature of the dual crystals.

Further objects and advantages of the invention will become apparent from the following description and claims and from the accompanying drawings, wherein Figure 1 is a vertical cross-sectional view taken through a temperature-controlled holder according to the present invention.

Figures 1, 2, 3, 4, 5:
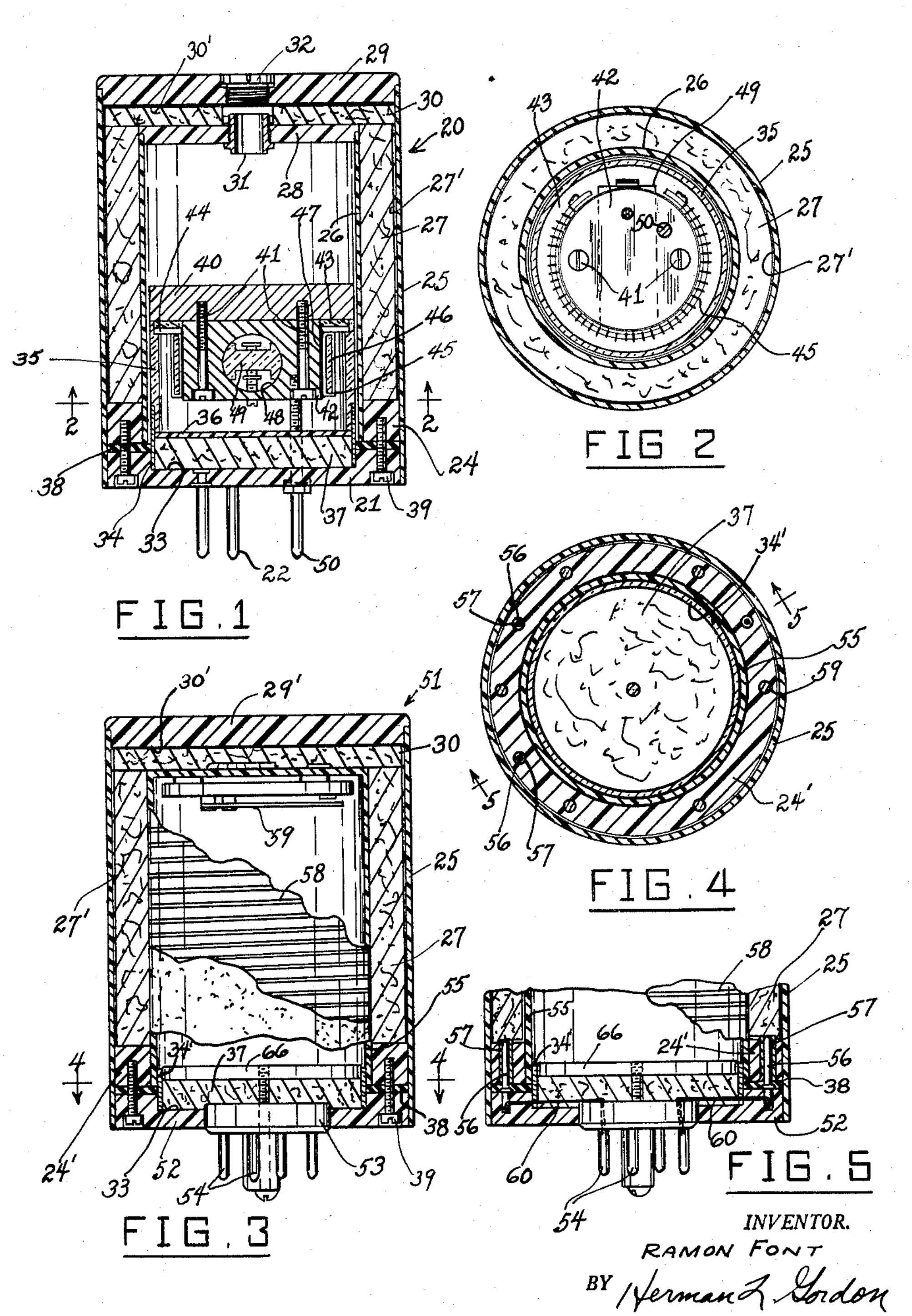
Figure 2 is a horizontal cross-sectional view taken on line 2—2 of Figure 1.
Figure 3 is a vertical cross-sectional view taken through a modified form of temperature-controlled enclosure according to the present invention.
Figure 4 is a horizontal cross-sectional view taken on line 4—4 of Figure 3.
Figure 5 is a vertical cross-sectional detail view taken on line 5—5 of Figure 4.
Figures 6, 7, 8, 9:
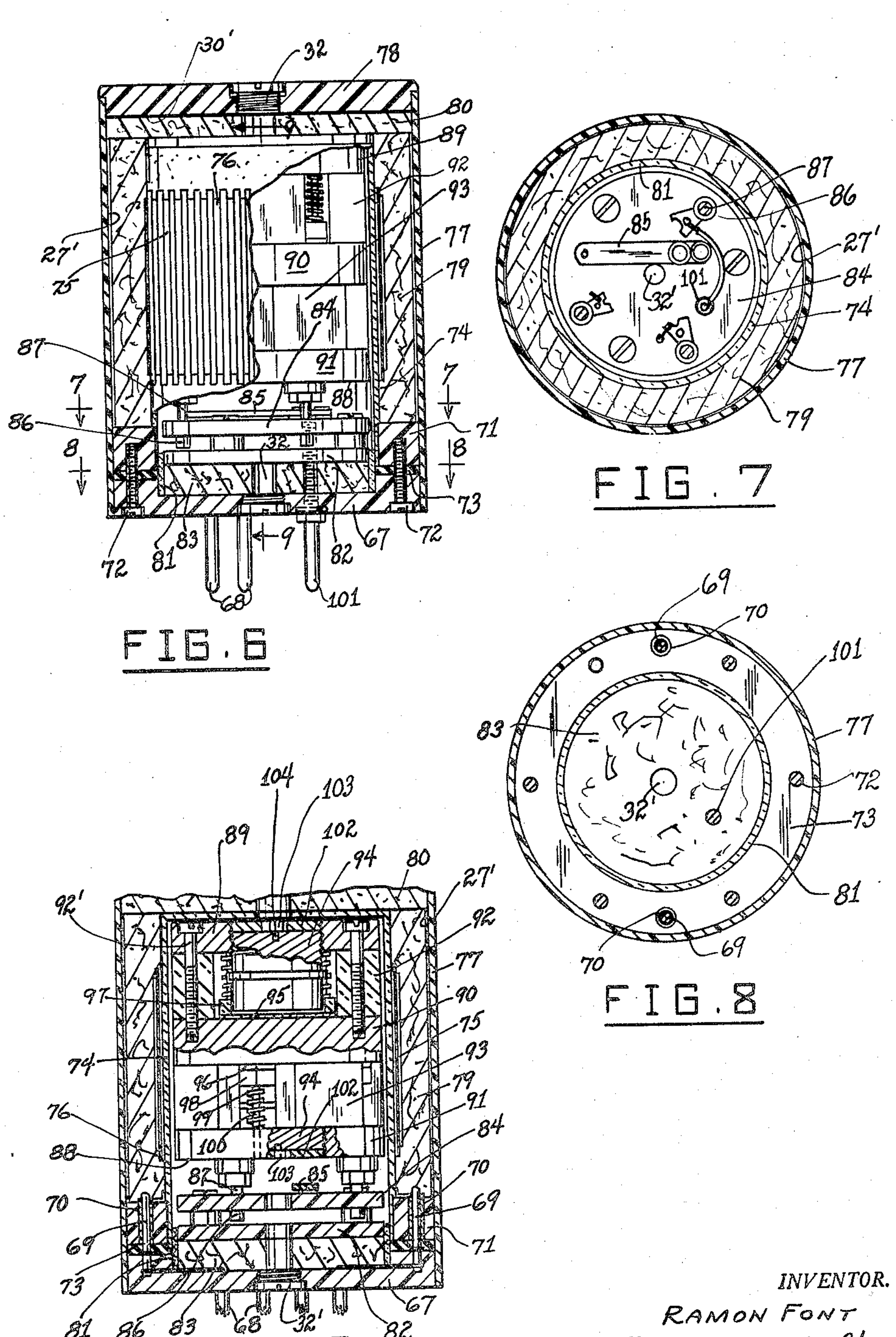
Figure 6 is a vertical cross-sectional view taken through a temperature-controlled piezo-electric crystal assembly employing dual crystals and employing a further modification of an enclosure according to the present invention.
Figure 7 is a horizontal cross-sectional view taken on line 7—7 of Figure 6.
Figure 8 is a horizontal cross-sectional view taken on line 8—8 of Figure 6.
Figure 9 is a fragmentary vertical cross-sectional view taken on line 9—9 of Figure 6.

Referring to the drawings, and more particularly to Figures 1 and 2, 20 generally designates a temperature-controlled holder which may be employed to house a piezo-electric crystal assembly of other electrical component to be maintained at a constant temperature. The holder 20 comprises a circular base 21 formed of insulating material and provided with the male prongs 22 for engagement in a suitable female socket to establish the electrical connections of the unit to its external circuit.

Designated at 24 is an annular ring of insulating material to the exterior periphery of which is secured the rigid outer cylindrical shell 25, of insulating material, and to the interior periphery of which is secured the rigid inner cylindrical shell 26, also of insulating material. Disposed between the shell members 25 and 26 is a mass of heat-insulation material 27, such as felt or the like.

Secured on the top rim of the inner shell 26 is an inner cover disc 28 of rigid insulating material, and secured on the top rim of the outer shell 25 is an outer cover disc 29, also of rigid insulating material. A mass 30 of felt or similar heat-insulating material is disposed between outer cover disc 29 and the top rim of felt mass 27, and inner cover disc 28, as shown.

A cylindrical metal sleeve 31 is centrally secured in cover disc 28, and cover disc 29 is provided with a removable screw plug 32 axially aligned with sleeve 31, which, when removed, allows an adjusting tool to be inserted into the inner shell 26.

Base 21 is formed with a circular recess 33 in which is secured an upstanding cylindrical flange member 34 of rigid insulating material, such as Fiberglas tubing, or the like. Secured in the upper portion of member 34 is the reduced lower end of another rigid shell member 35, of Fiberglas tubing or the like, to the bottom rim of which is secured the circular disc 36 of insulating material. A heat-insulating layer 37 of felt or the like, is disposed between disc 36 and the bottom wall of recess 33.

As shown, the lower portion of outer shell 25 receives the base member 21 and an annular gasket 38 of resilient deformable material is disposed between ring member 24 and the rim portion of base member 21. A plurality of screws 39 extend upwardly through the rim portion of base member 21 and gasket 38 and threadedly engage in ring member 24 to detachably fasten the main portion of the holder to the base member.

Designated at 40 is a relatively thick circular metal block, and secured to the underside of block 40 coaxially therewith, by means of screws 41, is another relatively thick circular metal block 42 of substantially smaller diameter than block 40. Secured to the underside of block 40 adjacent block 42 is a flat ring 43 of rigid, heat-insulating material, such as Fiberglas or the like. The outer edge of ring 43 is received in an annular recess 44 formed in the top rim of shell 35 and is secured to the inner surface of said recess. The peripheral portion of block 40 is supported on the rim of shell 35 adjacent recess 44.

Mounted on the block 42 is the annular heating coil 45, said coil being arranged on an annular form 46 of refractory insulating material, such as Fiberglas or the like. Heating coil 45 is insulated from block 42 by an insulating sleeve 47 of heat-resistant insulating material.

Block 42 is formed with a transverse bore 48 in which is mounted a thermostat 49. The terminals of thermostat 49 and heating coil 45 are connected by suitable conductors, not shown, to respective prongs 22.

The piezo-electric crystal assembly, or other electrical component, to be maintained at constant temperature is housed in the space above block 40. The heater coil 45 is connected to a suitable energizing circuit through the prongs 22, and through the thermostat 49, so that said thermostat controls the energization of coil 45 to maintain the space above block 40 at a substantially constant temperature, which may be regulated by suitably adjusting said thermostat. Due to the relatively large mass of blocks 40 and 42, rapid changes of temperature in the holder are prevented, whereby substantial stability of the temperature inside the holder is assured.

One of the prongs, shown at 50, extends upwardly and threadedly engages the bottom portion of block 42 to provide a ground connection for blocks 40 and 42.

Referring now to Figures 3, 4 and 5, 51 generally designates a modified form of temperature-controlled holder according to the present invention. The holder 51 comprises the circular base 52 of insulating material in which is centrally secured the male octal plug 53 having the contact prongs 54 for engagement in a suitable octal socket to establish the electrical connections of the unit to its external circuit.

Designated at 55 is a cylindrical inner container which is secured to the inner surface of a ring member 24' of rigid insulating material, said ring member being detachably fastened to base 52 by screws 39, as shown. The resilient, deformable annular sealing gasket 38 is interposed between ring 24' and base 52.

Base 52 is provided with the upstanding prongs 56 which are conductively received in contact sleeves 57 mounted in the ring 24', said contact sleeves respectively being connected to the terminals of a heater winding 58 helically wound on the inner container 55 and suitably insulated therefrom.

A thermostat 59 is mounted in the upper portion of container 55 and is secured to the top wall of said container. The thermostat terminals are connected to contact sleeves 57 for electrical connection to certain of the prongs 56. Prongs 56 are electrically connected by respective wires 60 to respective prongs 54, whereby the heater winding 58 and thermostat 59 may be connected to the heater energizing circuit.

It will be understood that suitable connections are provided in the external circuit whereby the thermostat 59 controls the energization of the heater winding to maintain the interior of container 55 at substantially constant temperature.

Secured to the outer surface of ring 24' is the outer shell 25, said outer shell being engageable over the periphery of base 52, as shown. Secured on the outer shell 25 is the circular top wall 29' of suitable rigid insulating material. Heat-insulating material 27 and 30, such as felt or the like, fills the space between shell 25 and its top wall 29', and the inner container 55.

As in the previously described form of the invention, base 52 is provided with a circular recess 33 containing heat-insulating material 37 disposed in a Fiberglas shell 34'. Secured in said shell 34' is the rigid cover disc 66, of suitable insulating material, overlying the heat-insulating material 37.

Access to the interior of the holder may be obtained by unfastening the screws 39, allowing the base 52 and the parts carried thereby to be disengaged from ring 24' and the inner container 55, the heater winding and thermostat being disconnected from the base by the disengagement of contact sleeves 57 from the prongs 56.

Container 55 may be of any suitable rigid material, such as metal, Fiberglas composition, or molded, heat-resistant plastic material.

Referring now to the form of the invention shown in Figures 6, 7, 8 and 9, the holder comprises the circular base member 67 having the depending contact prongs 68 and the upstanding contact prongs 69, 69, said upstanding prongs being located at the rim portion of the base member. Said upstanding contact prongs 69 are received in and conductively engage contact sleeves 70, 70 provided in the ring member 71, which is detachably secured to the rim of base member 67 by screws 72. An annular gasket 73 of resilient deformable material is interposed between ring 71 and the rim of base member 67 to provide a seal.

Secured in the ring 71 is the inner cylindrical container 74 on which is mounted the heater winding 75, said heating winding being wound on a cylindrical form 76 of insulating material which surrounds the container 74. As shown, the turns of heater winding 75 extend substantially parallel to the axis of the container 74. The heater winding 75 is suitably insulated from inner container 74, as by providing a layer of thin insulating material between the heater winding and the adjacent surface of the container. By making the inner container of heat-resisting insulating material, such as Fiberglas or the like, the heater winding may be allowed to contact the surface of the container, and the insulating layer is unnecessary.

Secured to the ring 71 is the outer shell 77 which receives the base member 67 in its lower portion. Shell 77 is provided with the top wall 78. Heat insulating layers 79 and 80, such as felt or the like, are provided around the inner container 74 and between the top wall of said container and wall 78, as shown.

Secured in the base member 67 is the cylindrical rigid Fiberglas ring 81, in the upper portion of which is secured the disc 82 of insulating material. A layer 83 of felt or the like, is provided between disc 82 and base member 67, as shown.

Secured on disc 82 is a similar disc 84 of rigid insulating material, on which is mounted the thermostat 85. The terminals of thermostat 85, as well as the upstanding contact prongs 69, are connected by suitable wires to respective prongs 68, for connection to the external energizing circuit for the heating winding 75. The terminals of said heating winding are connected to the sleeves 70, 70.

Secured in the disc 84 are contact sleeves 86 which are connected by suitable wires, not shown, to respective contact prongs 68. Conductively engaged in the sleeves 86 are the depending contact prongs 87 of a dual crystal-supporting assembly 88.

The crystal-supporting assembly 88 comprises the spaced metal blocks 89, 90 and 91. Ceramic spacer blocks 92 are interposed between the peripheral portions of metal blocks 89 and 90, and fastening screws 92' extend through blocks 89 and 92 and threadedly engage in block 90. Ceramic spacer blocks 93 are secured between the peripheral portions of metal blocks 90 and 91 in the same manner. Electrode plugs 94 are threadedly engaged centrally in the blocks 89 and 91 and extend toward the intermediate metal block 90. The respective crystals 95 and 96 are clamped against the respective top and bottom surfaces of block 90 by respective rectangular ceramic frames 97 and 98 surrounding the electrode plugs 94, said frames being urged against the marginal portions of the crystals by clamping springs 99 surrounding guide pins 100 secured in the respective blocks 89 and 91 and extending toward the respective corner portions of the frames. The clamping springs 100 engage the corner portions of the frames 97 and 98 and thereby exert the necessary force on said frames to clamp the crystals 95 and 96 against the respective top and bottom surfaces of intermediate block 90.

One of the external contact prongs, shown at 101, extends through discs 82 and 84 and is electrically connected to one of the sleeves 86 to provide a common ground connection, said sleeve 86 receiving a prong 87 which is, in turn, electrically connected to the lower block 91. The remaining prongs 87 are respectively connected electrically to the metal blocks 89 and 90 and are insulated from block 91.

The threaded plugs 94 are adjustable to provide the desired electrode air gaps with respect to the respective crystals 95 and 96. Locking rings 102 are threadedly engaged in the blocks 89 and 91 adjacent the plugs 94 to lock said plugs in adjusted positions with respect to the blocks.

The locking rings 102 are provided with non-circular apertures 103 for engagement by a suitable tool to rotate the locking rings when desired. The plugs 94 are provided with screw driver grooves 104 which may be engaged by the blade of a screw driver inserted through the apertures 103. Top wall 78 and bottom wall 67 are provided with removable screw plugs 32 and 32' which may be removed to provide access to the upper and lower electrode plugs, so that the air gaps of the crystals 95 and 96 may be adjusted without requiring the holder to be disassembled. However, by unfastening the screws 72, the main housing portion of the holder, including inner container 74 and heater winding 75, as well as the other elements secured to ring 71, may be disengaged from base 67, whereby the crystal-supporting assembly 88 may be readily removed for any other necessary adjustments without the necessity of unsoldering any electrical connections.

Figures 10, 11, 12, 13, 14:
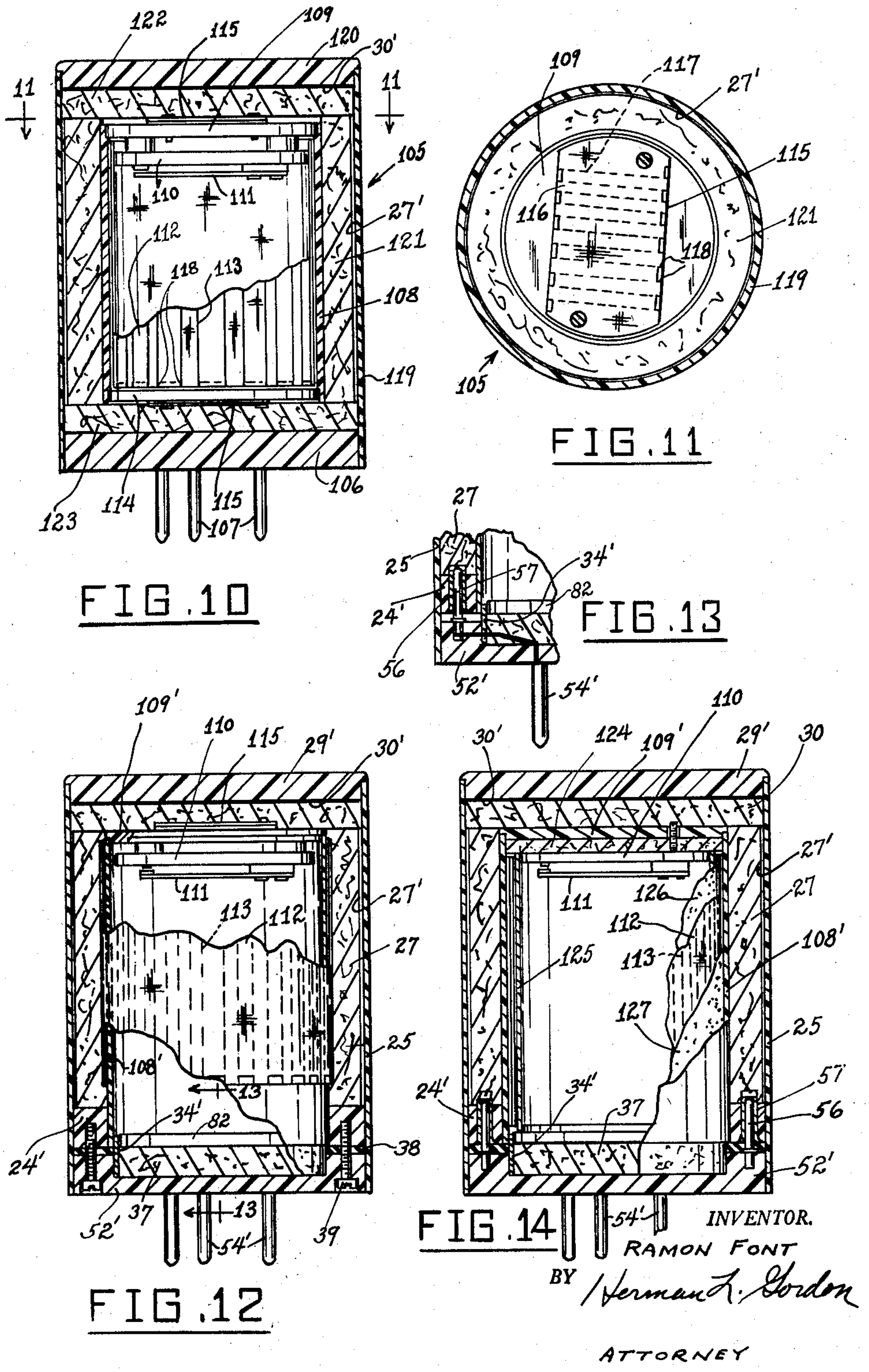
Figure 10 is a vertical cross-sectional view taken through a still further modification of a temperature-controlled enclosure according to the present invention.
Figure 11 is a horizontal cross-sectional view taken on line 11—11 of Figure 10.
Figure 12 is a vertical cross-sectional view taken through a still further modification of a temperature-controlled enclosure according to this invention.
Figure 13 is a vertical cross-sectional detail view taken on line 13—13 of Figure 12.
Figure 14 is a vertical cross-sectional view illustrating a still further modified form of temperature-controlled enclosure in accordance with the present invention.

Referring now to Figures 10 and 11, another form of temperature-controlled enclosure is designated generally at 105. The enclosure 105 comprises the circular base 106 of insulating material provided with the contact prongs 107. Designated at 108 is a cylindrical inner shell, preferably of heat-resisting insulating material, such as suitable plastic material, on the top rim of which is secured the disc member 109 of rigid insulating material. Secured to disc 109 in the upper portion of shell 108 is another disc 110 of rigid insulating material having a thermostat 111 secured to its bottom surface. Designated at 112 is a lining of varnished cambric, or similar insulating sheet material, disposed adjacent the inside surface of shell 108 and having the heater wire 113 mounted thereon, said wire being arranged in vertical loops extending around the lining, as shown. The shell 108 is provided with the detachable bottom cover disc 114 of rigid insulating material. Secured on the top surface of disc 109 and the bottom surface of disc 114 are respective additional heaters 115, each of said heaters comprising a supporting flat body 116 of insulating, heat-resistant material on which is secured a heater wire 117 arranged in parallel loops along the body 116, as shown in Figure 11. The side edges of the body are slit at 118 to define means for looping the wire therearound so that said wire may be distributed over the body in parallel loops, as illustrated. Similar slits are provided at the top and bottom edges of the lining member 112, for the same purpose.

The heater wires 113 and 117 are electrically connected in series, and the terminals of the series heater wire circuit are connected by suitable wires, not shown, to respective prongs 107. The terminals of the thermostat are also connected by wires, not shown, to respective prongs 107.

The bottom disc 114 may be detached from shell 108 for the insertion of the electrical component to be housed in the holder.

Designated at 119 is an outer shell of insulating material receiving and detachably secured to the periphery of base member 106. Secured to the top of shell 119 is the cover disc 120, of rigid insulating material. Respective layers of heat-insulating material, shown at 121, 122 and 123, of felt or the like, are provided around the inner container, as shown.

The form of the invention shown in Figures 12 and 13 is similar to that of Figure 10 except that the cambric member 112 is disposed around the outer surface of the inner shell, shown at 108', the member 112 carrying the heater wire 113. An additional heater 115 is secured on the top wall 109' of the inner shell and is connected in series with the heater wire 113. The inner shell 108' is secured in a ring member 24', similar to that of Figures 3, 4 and 5, which is detachably secured to the pronged base 52', said base being provided with upstanding prongs 56 which are conductively received in contact sleeves 57 provided in ring 24'. The sleeves 57 are connected to the terminals of the heater circuit and the thermostat 111 in the same manner as in the form of the invention of Figures 3, 4 and 5. The upstanding prongs 56 are connected to respective depending prongs 54' of base 52'. The ring 24' is secured in the outer shell 25, which fits over the base member 52'.

By unfastening the screws 39, the base 52' may be detached from the main housing portion of the holder, as in the previously described forms of the invention.

The form of the invention shown in Figure 14 employs the base member 52', similar to that of Figures 12 and 13, and employs a shell member 108' which fits over the rim of Fiberglas ring 34', as shown, the shell member 108' being secured in the ring 24'. Secured in the top of shell 108' is the cover disc 109'. Disposed beneath cover disc 109' and spaced therefrom by a layer 124 of felt or the like, is the insulating disc 110 which has the thermostat 111 secured to its bottom surface. Disc 110 is secured in the top end of an inner metal shell 125. The cambric layer 112 carrying the heater wire 113 is disposed between inner shell 125 and shell 108', suitable protective linings 126 and 127 of heat-resistant, insulating sheet material being provided between the heater wire and the respective shells 125 and 108'.

In order to improve the effectiveness of the heat insulation jackets employed between the inner container and the outer enclosure wall elements in the various embodiments of the invention above described, thin layers of aluminum foil or other reflective metal foil are preferably employed between the felt heat-insulating members and said outer elements. Thus, in Figures 1 and 2, a layer of aluminum foil 27' is employed between the heat-insulating material 27 and outer shell 25, and a layer of foil 30' is employed between heat-insulating material 30 and top wall 29. Similar aluminum foil layers 27' and 30' are employed in the other forms of the invention, as shown.

While certain specific embodiments of temperature-controlled enclosures and a crystal-supporting assembly adapted to be housed therein have been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. A temperature-controlled crystal assembly comprising a base, depending contact prongs secured to said base for connection to an external circuit, upstanding contact prongs on the peripheral portion of said base electrically connected to certain of the depending prongs, a housing member, said housing member including a ring element detachably secured on the peripheral portion of said base, contact means on said ring element conductively engaged with said upstanding contact prongs and being disengageable therefrom when the ring element is detached from said base, an inner shell secured to said ring element, a heater winding mounted on said inner shell, said winding being electrically connected to said contact means, three horizontal, spaced metal electrode elements mounted in said inner shell, threaded plugs in the center portions of the top and bottom electrode elements adapted to be adjusted relative to the intermediate electrode element, respective piezo-electric crystal plates clamped to the top and bottom surfaces of the intermediate electrode element, three contact prongs rigidly secured to the lower electrode element, one of said last-named prongs being in electrical contact with said lower electrode element, the other two of said last-named prongs being insulated from said lower electrode element and being electrically connected to the respective remaining electrode elements, prong-receiving means on said base conductively engaging said last-named three contact prongs and being electrically connected to certain of the remaining first-named depending contact prongs, and a thermostat mounted on said base subjacent said lower electrode element and being electrically connected to other of the remaining first-named depending contact prongs and being adapted to control the energization of said heater winding in accordance with the temperature of the space in the inner shell below the three metal electrode elements.

2. The structure of claim 1, and wherein said base is formed with an opening axially aligned with the threaded plug in the bottom electrode element and providing access thereto for adjusting same.

3. The structure of claim 2, and wherein said housing member and inner shell have top walls formed with openings axially aligned with the threaded plug in the uppermost electrode element and providing access thereto for the adjustment thereof.

References Cited in the file of this patent

UNITED STATES PATENTS

| | | |
|---|---|---|
| 2,102,783 | Bokovoy | Dec. 21, 1937 |
| 2,131,826 | Thomas | Oct. 4, 1938 |
| 2,203,545 | Peterson | June 4, 1940 |
| 2,210,045 | Schneider | Aug. 6, 1940 |
| 2,273,711 | Klein | Feb. 17, 1942 |
| 2,390,048 | Bach | Dec. 4, 1945 |
| 2,410,041 | Bokovoy | Oct. 29, 1946 |
| 2,438,345 | Miller | Mar. 23, 1948 |
| 2,462,850 | Eaton | Mar. 1, 1949 |
| 2,470,134 | Bitner | May 17, 1949 |
| 2,651,731 | Overbey et al. | Sept. 8, 1953 |